United States Patent
Kim et al.

(10) Patent No.: US 9,862,604 B2
(45) Date of Patent: Jan. 9, 2018

(54) BORON NITRIDE NANOTUBES AND PROCESS FOR PRODUCTION THEREOF

(71) Applicant: National Research Council of Canada, Ottawa (CA)

(72) Inventors: Keun Su Kim, Ottawa (CA); Christopher T Kingston, Ottawa (CA); Benoit Simard, Ottawa (CA)

(*) Notice: Subject to any disclaimer, the term of this patent is extended or adjusted under 35 U.S.C. 154(b) by 0 days.

(21) Appl. No.: 14/409,128

(22) PCT Filed: Apr. 4, 2014

(86) PCT No.: PCT/CA2014/050340
§ 371 (c)(1),
(2) Date: Dec. 18, 2014

(87) PCT Pub. No.: WO2014/169382
PCT Pub. Date: Oct. 23, 2014

(65) Prior Publication Data
US 2016/0083253 A1   Mar. 24, 2016
US 2017/0152142 A9   Jun. 1, 2017
US 2017/0253485 A2   Sep. 7, 2017

Related U.S. Application Data

(60) Provisional application No. 61/813,324, filed on Apr. 18, 2013.

(51) Int. Cl.
C01B 21/064   (2006.01)

(52) U.S. Cl.
CPC ................. *C01B 21/064* (2013.01)

(58) Field of Classification Search
CPC ... C01B 21/064; H04L 41/0813; H04L 41/22; G06F 3/0484; H01L 63/083
See application file for complete search history.

(56) References Cited

U.S. PATENT DOCUMENTS 5,629,053 A   5/1997   Treichel et al.
8,206,674 B2  9/2012   Smith et al.
(Continued)

FOREIGN PATENT DOCUMENTS

WO   2008/103221 A1   8/2008
WO   2008/140583 A2   11/2008
(Continued)

OTHER PUBLICATIONS

Extended European Search Report on European application 14785507.6.
(Continued)

*Primary Examiner* — Peter F Godenschwager
*Assistant Examiner* — Andrew J Oyer
(74) *Attorney, Agent, or Firm* — Hans Koenig; Brunet & Co. Ltd.

(57) ABSTRACT

A process for producing boron nitride nanotubes (BNNTs) involves providing a one or more sources of boron, nitrogen and hydrogen to a stable induction plasma to form a reaction mixture of boron, nitrogen and hydrogen in the plasma, and cooling the reaction mixture to form BNNTs. The process is capable of very efficiently producing small (10 nm or less diameter), reasonably pure BNNTs continuously in high yield at or around atmospheric pressure without the need to use metals as the catalyst. The process may be further modified by providing one or more sources of carbon to produce BNNTs doped with carbon (e.g. BCNNT).

16 Claims, 5 Drawing Sheets

(56) References Cited

U.S. PATENT DOCUMENTS

| | | | |
|---|---|---|---|
| 2007/0265379 A1 | 11/2007 | Chen et al. | |
| 2009/0214799 A1 | 8/2009 | Simard | |
| 2013/0064750 A1* | 3/2013 | Zettl | C04B 35/6229 423/290 |
| 2014/0272170 A1 | 9/2014 | Hales et al. | |
| 2015/0125374 A1 | 5/2015 | Smith et al. | |

FOREIGN PATENT DOCUMENTS

| | | |
|---|---|---|
| WO | 2013/037019 A1 | 3/2013 |
| WO | 2015/066428 | 5/2015 |

OTHER PUBLICATIONS

Solberg D, et al. ACS Nano, 2010, 4(6), 2979-2991.
Smith MW, et al. Nanotechnology, 2009, 20, 505604 (6 pp).
Huang, Y et al. Nanotechnology, 2011, 22, 145602 (9 pp).
Office action dated Jan. 23, 2015 on corresponding Canadian application CA 2,877,060.
Laurie OR, et al. CVD Growth of Boron Nitride Nanotubes. Chem. Mater. (2000) 12, 1808-1810.
Ma R, et al. CVD Synthesis of boron nitride nanotubes without metal catalysts. Chemical Physical Letters. 337 (2001) 61-64.
Shimizu Y, et al. Boron nitride nanotubes, webs, and coexisting amorphous phase formed by the plasma jet method. Appl. Phys. Lett. (1999) 75, 929.
Su C-Y, et al. Selective Growth of Boron Nitride Nanotubes by the Plasma-Assisted and Iron-Catalytic CVD Methods. J. Phys. Chem. C. (2009) 113, 14681-14688.
Tang C, et al. A novel precursor for synthesis of pure boron nitride nanotubes. Chem. Commun. (2002) 1290-1291.
Zhi C, et al. Effective precursor for high yield synthesis of pure BN nanotubes. Solid State Communications. 135 (2005) 67-70.
International Preliminary Report on Patentability dated Oct. 20, 2015 on International Application PCT/CA2014/050340 containing the Written Opinion of the International Search Authority dated Jul. 9, 2014.
International Search Report dated Jul. 9, 2014 on PCT/CA2014/050340.
Lee CM, et al. Synthesis of boron nitride nanotubes by arc-jet plasma. Current Applied Physics 6 (2006) 166-170.
Smith MW, et al. Very long single- and few-walled boron nitride nanotubes via the pressurized vapor/condenser method. Nanotechnology 20 (2009) 505604 (6pp).
Goldberg D, et al. Nanotubes in boron nitride laser heated at high pressure. Appl. Phys. Lett. 69 (14), Sep. 30, 1996.
Goldberg D., et al. (2010). Boron nitride nanotubes and nanosheets. ACS Nano, 4(6), 2979-2993.
Li LH, et al. (2010). Single deep ultraviolet light emission from boron nitride nanotube film. Applied Physics Letters, 97, 141104.
Huang Y, et al. (2011). Bulk synthesis, growth mechanism and properties of highly pure ultrafine boron nitride nanotubes with diameters of sub-10 nm. Nanotechnology, 22, 145602.

* cited by examiner

BORON NITRIDE NANOTUBES AND PROCESS FOR PRODUCTION THEREOF

CROSS-REFERENCE TO RELATED APPLICATIONS

This application is a national phase entry of International Patent Application PCT/CA2014/050340 filed Apr. 4, 2014 and claims the benefit of United States Provisional Patent Application U.S. Ser. No. 61/813,324 filed Apr. 18, 2013, the entire contents of both of which are hereby incorporated by reference.

FIELD OF THE INVENTION

The present invention relates to boron nitride nanotubes and processes for producing boron nitride nanotubes.

BACKGROUND OF THE INVENTION

Since the first discovery of carbon nanotubes (CNTs), boron nitride nanotubes (BNNTs) have been attracting much attention due to the structural similarity between graphite-like carbon system and hexagonal boron nitride (h-BN) system. BNNTs are isoelectronic analogues of carbon nanotubes which can be made by rolling up single or few layered h-BN sheets. In 1994, BNNTs were predicted by theory as a structural counterpart of CNTs in the h-BN system and successfully synthesized in 1995 by an arc discharge method.

Theoretical or computational studies have demonstrated that BNNTs have excellent properties such as low density with high mechanical strength, electrical insulation with high thermal conductivity, piezoelectricity, unique optical/optoelectronic properties, good radiation shielding ability, and superb resistance to thermal or chemical stresses. Some of those properties are predicted to be comparable to or even superior to those of CNTs. Many novel applications of BNNTs in nanoscience and nanotechnologies are expected.

In spite of the predicted potentials of BNNTs, there have been few experimental studies on the detailed properties of BNNTs, most of them being limited to large diameter BNNTs (>10 nm). To fully take advantage of the distinct phenomena occurring at nanoscales, small diameter BNNTs would be more favorable. The lack of experimental study on BNNTs is primary due to the absence of well-established BNNT synthesis methods, which seems to be more challenging compared to the CNT case. In particular, the absence of an effective method for the large-scale synthesis of small diameter BNNTs is still a prime obstacle in further understanding BNNT characteristics and their real applications. Therefore, in order to expand BNNT applications by fully exploring their unique properties, a reliable synthesis route capable of producing ultrafine BNNTs (<10 nm) at large scales (kg/day) is urgent.

Due to the structural similarity, the initial attempts for BNNT synthesis were made by using various modified version of CNT synthesis methods. BNNTs were produced for the first time by evaporating boron (B) containing electrodes in an arc discharge reactor. Laser vaporization processes have also been developed by irradiating lasers on B containing targets under $N_2$ atmosphere. Although BNNTs have been produced successfully in those approaches, the yield rates are low (mg/h) and the products contained various impurities as well, such as metal nanoparticles and h-BN flakes.

Chemical vapor deposition (CVD) methods have been also investigated. BNNTs were produced on the surface of boride nanoparticles from the decomposition of borazine ($B_3H_3N_6$). A floating catalyst CVD was reported by using borazine along with a vapor phase metal catalyst of nickelocene. In this process, double-walled BNNTs were exclusively produced. A simple ball milling and annealing method was developed but the most of the products were highly disordered or bamboo-type BNNTs.

Recently, a boron oxide CVD (BOCVD) method has been developed using B powder and metal oxide as a feedstock. In this process, white-colored pure BNNTs were produced for the first time but diameters of the BNNTs produced were on the order of 50 nm. Recent advances in this method allowed the production of small diameter BNNTs by choosing an effective metal oxide. Very recently, a so-called pressurized vapor/condenser (PVC) method has been proposed. Highly crystalline, long, and small diameter BNNTs were produced from B vapor under high pressure nitrogen atmosphere (2-250 atm) but again the yield is no more than a few grams per day, the yield rate demonstrated being about 0.1 g/h.

BNNTs have been also prepared using a DC arc-jet plasma generated from a DC arc discharge plasma torch. A mixture of h-BN powder and Ni/Y catalysts was injected into the plasma plume issuing from a DC plasma torch. The formation of BNNTs was confirmed but BNNTs were found in the limited area of the reactor. A variation on a DC arc-jet plasma apparatus requiring material inlet ports along the length of the plasma plume has also been proposed.

Most processes developed so far, including arc discharge, laser vaporization, ball milling, CVD, and BOCVD method, are basically operated in a batch mode, intrinsically limiting their scalability. Reaction times in those processes are also typically long and the yield rates do not meet the needs of the current market. A fair amount of BNNTs can be produced from the ball-milling process, but the characteristics of BNNTs produced in this method are far from those of small diameter BNNTs which have drawn the most interest from theoretical studies.

The floating catalyst CVD method has potential for large-scale production of BNNTs, however this approach is not favorable in terms of the commercial-scale operation as this process employs toxic chemical agents such as borazine or nickelocene, which also contain carbon impurities. The DC arc-jet method has good scalability however the production of BNNTs in this method is not efficient, being limited only to the region of the periphery of the plasma jet which is not truly continuous.

Most processes described above also use metal catalysts which will require additional purification steps in advance to practical applications, increasing the cost and complexity of the overall process.

The PVC method developed recently seems to have a great potential as long as a steady B evaporator is available such as $CO_2$ lasers, free electron lasers, or electron accelerators. However the initial investment or operation cost for such facilities will be very prohibitive at commercial scales. The high pressure operation around 12 atm (the reported optimum $N_2$ pressure) would be another challenge in scaling up the reactor vessel. Currently the daily yield rate is no more than a few g per day.

There remains a need for an efficient scalable process for producing high purity nanoscale BNNTs.

SUMMARY OF THE INVENTION

There is provided a process for producing boron nitride nanotubes (BNNTs) comprising providing one or more sources of boron, nitrogen and hydrogen to a stable induction plasma to form a reaction mixture of boron, nitrogen and hydrogen in the plasma, and cooling the reaction mixture to form BNNTs.

There is further provided BNNTs produced by the process described above. In particular, there is provided a composition comprising a plurality of metal-free boron nitride nanotubes having an average diameter of 10 nm or less.

There is further provided a free-standing transparent film comprising boron nitride nanotubes.

Stable induction plasma may be generated using an induction plasma torch, for example, a radio frequency (RF) inductively coupled thermal plasma torch. The stable plasma may be formed from a plasma gas in a plasma zone. Any suitable plasma gas may be used. Preferably, the plasma gas forms the stable plasma without being involved in the reaction between boron and nitrogen. This allows for precise control of the plasma temperature and particle density and provides the opportunity to incorporate boron feedstock materials directly in the plasma. Examples of suitable plasma gases are argon, helium or a mixture thereof. Argon is preferred.

The induction plasma torch is provided with one or more inlets through which the plasma gas and the boron, nitrogen and hydrogen sources may be provided to the plasma. The one or more inlets are preferably upstream of the plasma. In addition to the plasma gas and boron, nitrogen and hydrogen sources, the one or more inlets also provide means by which a sheath gas may be provided to the plasma. The sheath gas suitably comprises an inert gas that assists in stabilizing the plasma. Examples of inert gases are argon, helium or a mixture thereof. Argon is preferred.

The plasma gas is preferably injected into the plasma zone through a dedicated inlet. The one or more sources of boron are preferably injected into the plasma zone through a single inlet. The one or more sources of nitrogen may be injected into the plasma zone through one or more inlets. In some embodiments, one of the sources of nitrogen may be the same material as a source of boron, and therefore provided to the plasma zone through the same inlet as source of boron. In other embodiments, one of the sources of nitrogen may be a separate material from the source of boron and provided to the plasma zone through a separate inlet. In yet other embodiments, there may be one or more sources of nitrogen that are the same material as a source of boron and therefore provided to the plasma zone through the same inlet as the one or more sources of boron, and one or more other sources of nitrogen provided to the plasma zone through a separate inlet. Where a source of nitrogen is gaseous and is separate from the sources of boron, that source of nitrogen may be conveniently provided to the plasma zone in admixture with the sheath gas. The one or more sources of hydrogen may be provided in any form to the reaction mixture in the plasma form, but is most conveniently provided in gaseous form in admixture with the sheath gas, although a separate inlet from the sheath gas inlet could be used if desired. Where one or more sources of boron, nitrogen and/or hydrogen are in solid or liquid form, it may be convenient to use a carrier gas to carry them into the plasma zone. Carrier gases are suitably inert gases, for example argon, helium or a mixture thereof. Argon is a preferred carrier gas.

The inductively coupled plasma torch is capable of producing high temperature plasmas. The temperature of the plasma may be in a range of 1,000-10,000 K. Preferably, the temperature at the plasma core is in a range of 7,000-9,000 K.

The pressure of the stable induction plasma, and therefore the pressure to which the reaction mixture is subjected, may be important in certain circumstances. A pressure of less than about 2 atm or less than about 1.9 atm is preferred. A pressure of greater than about 0.6 atm or greater than about 0.8 atm or greater than about 0.95 atm is preferred. Exemplary ranges of preferred pressures are 0.8-1.9 atm, 0.9-1.9 atm, 0.95-1.9 atm, 0.9-1 atm, and 0.95-1 atm.

The one or more sources of boron may be in any physical form, for example, a solid, liquid or gas. Solid forms, for example, powders are of particular note. Powdered boron sources preferably have average particle sizes in the nanometer range, for example 1-1000 nm, more particularly 10-100 nm or 50-100 nm. The one or more sources of boron are not limited to any particular boron compound. Some suitable powder sources of boron include, for example, elemental boron, boron nitride, boron oxide, boric acid, metal borides, ammonia borane, a derivative of ammonia borane, borazine, a derivative of borazine or any mixture thereof. One suitable liquid source comprises borazine. One suitable gas source comprises a borane. Boron nitride, particularly hexagonal boron nitride (h-BN), is preferred. Metal-free boron sources are of particular note.

The one or more sources of nitrogen may be in any physical form, for example, a solid, liquid or gas. Some examples of nitrogen sources are boron nitride, $N_2$, $NH_3$, $NH_4OH$, borazine or any mixture thereof. Where boron nitride (e.g. h-BN) is used as one of the boron sources, the boron nitride also serves as a source of nitrogen, in which case that nitrogen source is a solid or liquid. $N_2$ and $NH_3$ are gaseous nitrogen sources. $NH_4OH$ and borazine are liquid nitrogen sources. Preferably, at least one of the nitrogen sources is in the form of a gas. $N_2$ is a preferred gaseous source of nitrogen.

The one or more sources of hydrogen may be in any physical form, for example, a solid, liquid or gas. Some examples of the one or more sources of hydrogen are $H_2$, $NH_3$, $NH_4OH$, a borane or any mixture thereof. $NH_3$ and $NH_4OH$ can therefore act as sources of both nitrogen and hydrogen, while boranes can act as sources of both boron and hydrogen. Preferably, at least one of the hydrogen sources is in the form of a gas. $H_2$ is a preferred gaseous source of hydrogen.

It is generally known that hydrogen can be used in plasma applications where high powers are especially needed, due to its high heat capacity. However, in the present induction plasma process it is found that hydrogen appears to act as a particularly strong catalyst and necessary ingredient in the formation of BNNTs, which is surprising since the use of hydrogen in a similar induction plasma process to form CNTs resulted only in soot with no CNT production. Therefore, the induction plasma process for the formation of CNTs as described in US 2009-0214799 (Simard 2009) does not use hydrogen in the actual synthesis step, but only uses hydrogen in the sheath gas to assist in preheating the reactor rapidly before the production of CNT begins. In US 2009-0214799, hydrogen is replaced with helium for the actual synthesis of CNTs. Likewise, in a DC arc jet-plasma process (Zettl 2013) although it is suggested that hydrogen may be useable in the plasma gas, it is apparent from the extremely high operating temperature (10,000-20,000° C.) that the hydrogen would be used to increase and maintain plasma power, a step routinely used in the art. Further, it was generally known that although adding hydrogen may increase plasma power, under non-optimum conditions it may also inhibit the BNNT formation via hydrogen-driven reactions at high temperatures. For this reason, it is unsurprising that hydrogen was not actually used in the DC arc-jet plasma process of Zettl (Zettl 2013), nor in another related DC arc-jet plasma process (Lee 2006). In the present induction plasma process, the presence of hydrogen is essential for the chemistry of BNNT production and to obtain high BNNT yields. BNNTs could not be produced efficiently in the absence of hydrogen in the reaction mixture in the present process.

The composition of plasma gas can be important not only on chemistry in the reaction mixture, but also on the thermo-fluid fields (e.g., temperature and velocity fields) of the plasma. Sheath gas composition may be optimized accordingly for specific applications. To facilitate B—$N_2$ reactions in the formation of BNNTs, the sheath gas preferably comprises a mixture of $N_2$, $H_2$ and Ar. Elevated levels of $N_2$ or $H_2$ would facilitate B—$N_2$ reactions, but such diatomic gases can lower the plasma temperature due to the additional energy requirement for molecular dissociation and intensive heat exchange with the environment (thermal conductivities of diatomic gases are usually high). Higher Ar contents would be ideal for sustaining high temperatures but the chemical reaction could be limited by depletion of $N_2$ and/or $H_2$. In addition the low thermal conductivity of Ar gas could inhibit feedstock vaporization inside the plasma. Argon does not need to be present in the sheath gas but is preferably present in the sheath gas in an amount of 1-85 vol %, more preferably about 20-45 vol %. Nitrogen is preferably present in the sheath gas in an amount of 10-95 vol %, more preferably about 35-65 vol %. Hydrogen is preferably present in the sheath gas in an amount of 5-40 vol %, more preferably about 5-20 vol %. The proportions of each may be adjusted understanding that the total combined percentage does not exceed 100%.

In one embodiment, the sheath gas may comprise 34-44 vol % Ar, 38-48 vol % $N_2$ and 8-18 vol % $H_2$. In another embodiment, the sheath gas may comprise 10-30 vol % Ar, 40-70 vol % $N_2$ and 10-30 vol % $H_2$. In one particular example, the sheath gas may comprise 38 vol % Ar, 46 vol % $N_2$ and 16 vol % $H_2$. In another particular example, the sheath gas may comprise 20 vol % Ar, 62 vol % $N_2$ and 18 vol % $H_2$. In yet another particular example, the sheath gas may comprise 23 vol % Ar, 50 vol % $N_2$ and 27 vol % $H_2$.

Because boron droplets act as seeds for BNNT growth in the present process, it is unnecessary to use metal catalysts, which is particularly advantageous when metal-free BNNTs are desired. However, it is still possible to include one or more metal catalysts. Some examples of metal catalysts are pure metals, metal oxides, metal salts or any mixture thereof. Mixed metal oxides are of particular note. The metal catalyst may contain, for example, nickel, iron, cobalt, cerium, yttrium, molybdenum or any mixture thereof. Such metal catalysts are generally known in the art.

It is also possible to produce carbon-doped BNNTs (e.g., B—C—N nanotubes, BCNNT) by further providing one or more sources of carbon to the reaction mixture. The one or more sources of carbon may be in any physical form, for example, a solid, liquid or gas. Some examples of carbon sources are elemental carbon (e.g. graphitic carbons, amorphous carbons), carbon monoxide, carbon dioxide, hydrocarbons (e.g. acetylene, methane), or any mixture thereof. Doping of boron nitride nanotubes with carbon permits band gap engineering to tailor electronic and/or thermal properties of the nanotubes for specific applications.

The induction plasma torch may be part of an induction plasma reactor in which the induction plasma torch is coupled to a reaction chamber in which BNNTs are formed (i.e. nucleate), grow and then stop growing (i.e. terminate). The reaction chamber may be, for example, a steel chamber lined with a refractory material (e.g. graphite, BN). The reactor may further comprise a collection chamber comprising a collection zone in which the BNNTs produced by the process are collected.

The plasma zone of the induction plasma torch is in fluid communication with a reaction zone in the reaction chamber. The reaction mixture formed in the plasma zone moves downstream to the reaction zone where the reaction mixture begins to cool due to expansion. A high cooling rate in the reaction zone obtainable in the present process provides a strong driving force for the nucleation of small-sized boron droplets, which are important for the formation of small diameter BNNTs. The cooling rate may be in a range of about $10^4$-$10^6$ K/s, for example about $10^5$ K/s. By adjusting the temperature gradient through the reaction chamber, it is possible to adjust the morphology and size of the BNNTs produced in the process. The BNNTs produced by the process are then collected in the collection zone of the collection chamber downstream of the reaction chamber, the collection zone being in fluid communication with the reaction zone. The collection chamber preferably comprises a filtration unit, for example a vacuum filtration unit, comprising one or more filters. BNNTs formed may be collected from the collection chamber or even off the walls of the reactor between the reaction chamber and collection chamber.

BNNTs produced in the present process are reasonably pure already, and are amenable to further simple purification processes to remove mainly amorphous boron and non-tubular BN nanostructure impurities. Some purification processes include thermal purification and liquid extraction.

Boron nitride nanotubes (BNNTs) produced in the present process advantageously have average diameters of 10 nm or less, for example 1-10 nm. The BNNTs are generally multi-walled, although single-walled BNNTs can also be formed. Multi-walled BNNTs are generally few-walled boron nitride nanotubes (FWBNNT). BNNTs can be produced in bulk masses of different morphologies including laminated flexible cloth-like materials, fibril-like materials and thin transparent films. The thin transparent films may be free-standing. Such films may have thicknesses on the order of 100-200 nm.

In a particularly important embodiment, the process comprises providing one or more sources of boron, nitrogen and hydrogen to a stable induction plasma to form a reaction mixture of boron, nitrogen and hydrogen in the plasma at a pressure at or close to atmospheric pressure (e.g. in a range of about 0.8-1.9 atm, more particularly 0.9-1.9 atm or 0.95-1.9 atm), and cooling the reaction mixture to form BNNTs. This embodiment is particularly useful when producing metal-free BNNTs from metal-free boron feedstock as high yields of reasonably pure BNNTs without the use of metal catalyst can be realized. DC plasma methods and PVC methods are unsuitable for this.

The process of the present invention may provide one or more advantages over prior art processes, for example, it is a true continuous process, it is highly efficient at generating boron vapor, it can produce high yields of BNNTs, it can be highly selective to smaller diameter BNNTs, it can produce BNNTs that are reasonably pure, it can be done at or about atmospheric pressure, it can produce BNNT material of diverse morphologies, it can produce BNNTs that are easier to purify and to functionalize chemically, it is more environmentally friendly and it is scalable. The present process is suitable for effective treatment of large quantities of feedstock, thereby allowing the commercial-scale production of small diameter BNNTs in a continuous manner.

True continuous process: Unlike existing technologies, the present process is not limited by the lifetime of consumable electrodes or solid targets containing boron sources. Any form of feedstock (e.g. solid, liquid or gas) can be delivered into the process continuously. An induction plasma torch also is a maintenance-free device.

High efficiency in generating boron vapor: The supply of plentiful boron vapor is an important initial step for successful BNNT synthesis. In the present process, an induction plasma torch is employed for this purpose. Although the induction plasmas have distinct advantages over other conventional heat sources in generating boron vapors due to their high enthalpy and high temperature, no previous attempts have been made to use induction plasmas in the BNNT synthesis. Use of DC plasmas as a heat source has been reported (Lee 2006; Zettl 2013), however DC plasmas are inefficient and have low yield rates. Induction plasma has the following advantages over other types of plasmas, which lead to the successful synthesis of small diameter BNNTs: i) feedstock is injected directly into the plasma core rather than the tail where temperature is much lower than that of the plasma core; ii) there is a larger volume of plasma compared to DC plasmas; iii) the velocity of the induction plasma jet is lower than those of DC plasma jets, increasing the residence time of feedstock inside the plasma, thereby improving the vaporization efficiency; and, vi) reactant gases can be also injected directly into the plasma core without disturbing the plasma stability.

High yield rate: The yield rate of the present process is very high compared to those of other conventional processes. Process time can be as rapid as few milliseconds due to the short residence time of feedstock in the plasma jet, thereby increasing the throughput significantly. The yield rate can be about 10 g/h, or about 20 g/h, or even higher, which is an unprecedentedly high yield rate. In the prior art for the bulk synthesis of small diameter BNNTs, yield rates demonstrated were typically only about 200 mg per batch. Thus, kilogram-scale synthesis of small diameter BNNTs is made possible.

High selectivity to small diameter BNNTs: In the present invention, boron vapors generated inside the plasma torch are quenched out rapidly (at about $10^5$ K/s) and are very supersaturated upon plasma jet expansion at the entrance of the reaction chamber. This exceptional quenching rate of the induction plasma provides a strong driving force for abundant nucleation of small diameter boron droplets and also prevents the droplets formed from growing continuously. In the present process, it is therefore possible to produce small diameter BNNTs exclusively without the help of metal catalysts or additional condensers.

Reasonable purity: In the present process, most of BNNTs produced are few walled, their diameters being 10 nm or less, and are at least 50% pure, for example at least 70% pure. Therefore, the present process lends itself well to large-scale synthesis of small diameter BNNTs with a reasonable purity and quality.

Atmospheric pressure operation: According to the "root growth mechanism" of BNNTs, a high pressure operation would be favorable to facilitate BN formation through vigorous collisions between boron droplets and nitrogen sources. For example, in the PVC method (Smith 2009; Smith 2012), it is reported that no BNNT was produced at $N_2$ pressures under 2 atm, and that the optimum pressure is about 12 atm. However, high pressure operations would be very challenging at large scales. In the present process, BNNTs can be synthesized with a reasonable purity even at atmospheric pressure, especially if a hydrogen source is introduced as a reactant. Atmospheric pressure operation is highly desirable because it reduces facility costs significantly by eliminating the need for expensive low and high pressure equipment.

Diversity in the morphology of the product: Most BNNT materials produced with existing technologies are limited to deposits scraped from the reactor walls or cotton-like fibrils. However, real applications or scientific investigation of as-produced materials may require materials in various forms. The present process can produce BNNT materials with several different morphologies in the same run: i) laminated flexible cloth-like materials on the surfaces of filters; ii) fibril-like materials on the top of filters; and iii) thin transparent films on the straight section between the reactor and the filtration chamber.

Easier to purify and to functionalize chemically: The main impurities in the present process are amorphous boron and other non-tubular BN nanostructures. Preliminary purification studies show that those impurities are relatively easily removable from the as-produced BNNT materials without employing harsh or toxic chemical routes prevailing in the CNT case. Combining the present process and simple purification protocols will open up new possibilities in providing high purity small diameter BNNTs at large scales. The small diameters make chemical functionalization easier than with larger (>10 nm) diameters with tend to require long exposure to harsh media (low and high pH, extreme oxidative conditions and high pressures).

Environmentally friendlier: The whole process is environmentally friendlier since non-toxic feedstock (e.g. h-BN powder) and inert operating gases may be used.

Scalable: Induction plasma technology has a good scalability as it is a matured technology and currently high power torches up to about the megawatt (MW) level are available with reasonable costs.

BNNTs have a variety of applications, for example, strong light weight articles (e.g. lightweight transparent armors) and electronic insulators. BNNTs have mechanical properties similar to CNTs except that BNNTs are transparent, and are supposed to be even more practical than CNTs at high temperature and/or in chemically harsh environments. Therefore BNNT composites are ideal for the design of a new class transparent armor with reduced weight and increased strength, without compromising visibility. Due to their high band gap of about 5.5 eV, BNNTs are basically electrical insulators. However, unlike normal electrical insulators, BNNTs have high thermal conductivity. An insulating material with a high heat dissipation rate would be very good as an insulating substrate, especially for highly integrated circuits. Band gap engineering of BNNTs is also feasible in a controlled way through doping them with carbon, allowing a wide range of applications in the printable electronics including photoluminescence, nanoscale electronic devices and sensors.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Figure 1:
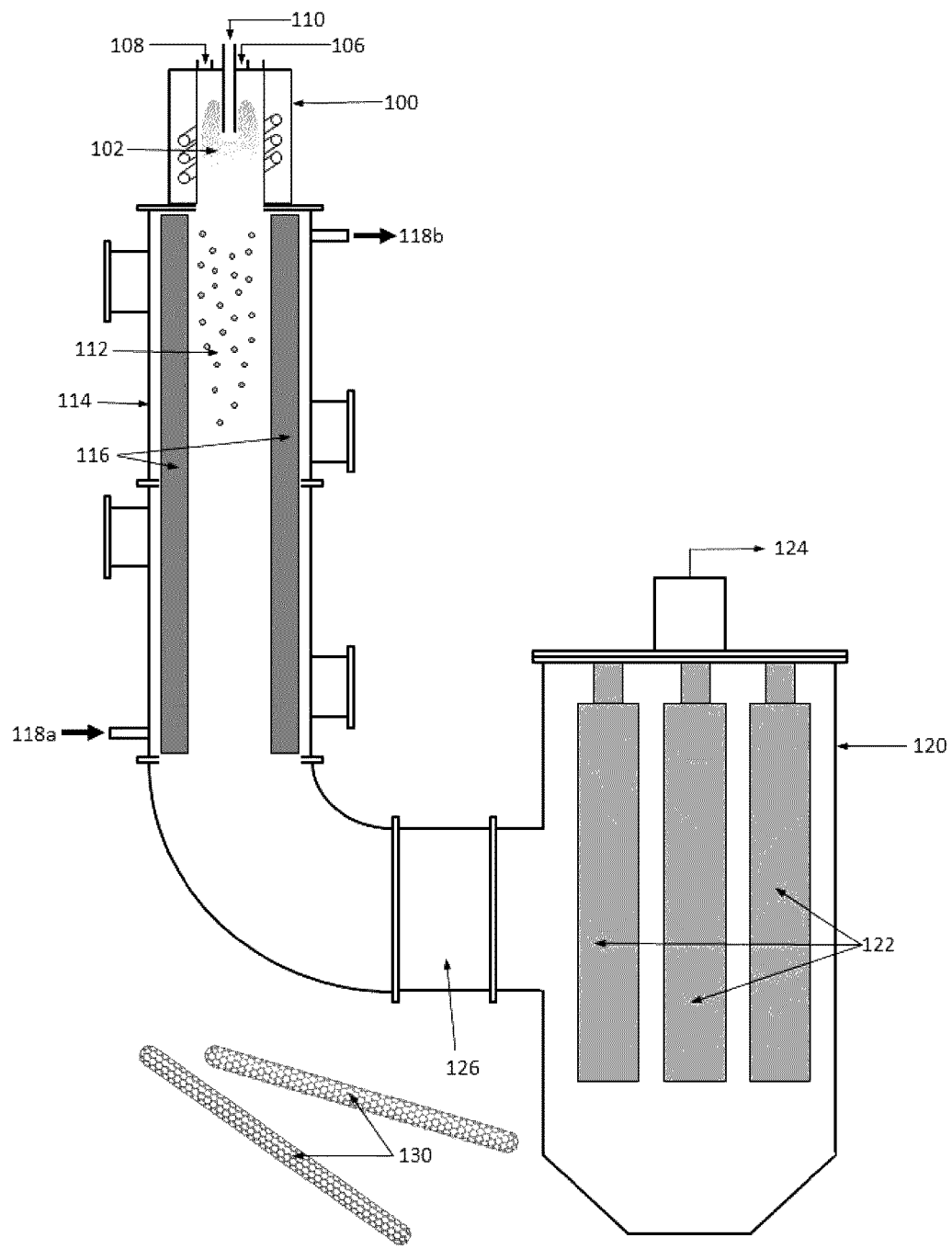
FIG. 1 is a schematic diagram of an induction plasma reactor showing a BNNT synthesis process in accordance with the present invention.

With reference to FIG. 1, a schematic diagram of an induction plasma reactor suitable for synthesis of boron nitride nanotubes (BNNTs) in accordance with the present invention is shown. The basic design is adapted from a similar induction plasma reactor for carbon nanotubes (CNTs) as previously described in the art (Simard 2009).

In one embodiment, the reactor comprises a 2-5 MHz radio frequency (RF) inductively coupled plasma torch 100 (e.g. a Tekna PL-50 from Tekna Plasma Systems, Inc.) that can produce high temperature thermal plasma jet 102 in a plasma zone. A stable plasma can be maintained by heating a central inert plasma gas (e.g. argon) to a high temperature (e.g. about 8000 K). The central plasma gas is provided to the plasma zone through central gas inlet 106. A sheath gas may also be introduced into the plasma zone through sheath gas inlet 108, the sheath gas assisting in stabilizing the thermal plasma. The sheath gas may comprise an inert gas (e.g. argon) and/or one or more reactant gases that provide a source of nitrogen (e.g. $N_2$), and hydrogen (e.g. $H_2$). Boron-containing feedstock (e.g. metal-free h-BN) may be provided to the thermal plasma through feedstock inlet 110 and the feedstock can be carried by a carrier gas (e.g. argon). Where the feedstock is a powder, a powder feeder may be used to inject the feedstock into the plasma zone.

The boron-containing feedstock and the nitrogen- and hydrogen-containing reactant gases may be continuously injected into the high temperature induction plasma jet 102 to form a reaction mixture of boron and nitrogen species. The boron-containing feedstock evaporates almost immediately (<1 ms) in the plasma releasing abundant boron vapors, and in the case of boron nitride feedstock also releases nitrogen. The nitrogen-containing reactant gas injected into the plasma also generates reactive nitrogen radicals (e.g., N, $N^+$, $N_2^+$) to improve nitrogen reactivity toward boron for the formation of BNNTs.

The reaction mixture of reactive boron and nitrogen species is carried from the plasma zone into a reaction zone 112 in a reaction chamber 114, which is in fluid communication with the plasma zone. The reaction zone contains a refractory liner 116 for maintaining the process temperature and controlling the temperature gradient. In the reaction zone, boron vapors are cooled rapidly through the plasma jet expansion and nano-sized boron droplets are formed as the temperature cools down in the reactor. It is thought that BNNTs grow continuously from such boron droplets by adsorbing nitrogen species formed in the plasma. Based on the widely accepted "root growth mechanism" of BNNTs, the effective generation of boron vapors and a controlled cooling of the vapors inside the reactor are of particular importance to abundant nucleation of small diameter boron droplets, which are known to be the practical precursors of small diameter BNNTs. Vigorous interactions between those boron droplets and the nitrogen species are also important for rapid growth of BNNTs from the boron droplets.

As the BNNTs pass through the reaction chamber 114 their growth slows and is finally terminated. It should be noted that the growth process occurs over the whole of the reaction pathway from when the vapors enter the reaction chamber and begin to nucleate to when the formed BNNTs finally leave the reaction chamber. Initial cooling of the vapors in the reaction chamber permits nucleation of boron droplets that can then react with nitrogen species to start the formation of BNNTs. BNNTs continue to grow in their passage through the reaction chamber. As the reaction mixture cools further down in the reaction chamber, the continued growth of the BNNTs is ultimately terminated. The reaction chamber is cooled with a water jacket. Water flows into the water jacket through water inlet 118a and out through water outlet 118b.

BNNTs formed during the passage through the reaction chamber are collected using a vacuum filtration unit that comprise a filtration chamber 120 in fluid communication with the reaction chamber through a pipe 126. A vacuum pump connected to vacuum port 124 draws BNNT-laden gases through porous filters 122 in the filtration chamber, whereupon the BNNTs are deposited on the filters while the gases are drawn out. Boron nitride nanotubes 130 can then be collected off the filters or the pipe.

Thus, in the present invention, a high enthalpy directional flow (i.e. plasma jet) generated from an induction plasma torch is employed for the continuous and effective generation of boron vapors from boron-containing feedstock (e.g. solid h-BN powder) while no metallic catalyst is required.

Although the induction plasma reactor used for a process of the present invention is based on the one described previously in US 2009-0214799 (Simard 2009), there are a number of important differences between the present process for BNNTs and the prior art process for carbon nanotubes (CNTs).

The nucleation mechanism in US 2009-0214799 requires metal nanoparticle to play a role as seeds, therefore, the presence of metal catalysts is important. In the present invention, amorphous boron droplets play the role as seeds or growth substrates, so no metal catalyst is needed. Further, the growth of CNTs in the process of US 2009-0214799 involves precipitation of carbon clusters onto the surfaces of metal particles. Thus, no chemical reaction occurs and the selection of metal catalyst is important taking into account carbon solubility, radiative heat transfer and other properties of the metal. In the present invention, incorporation of nitrogen into boron droplets (formed when boron vapors cool) occurs followed by chemical reaction of boron and nitrogen to form BN, and then precipitation of BN onto boron droplets. This is a fast and vigorous in-flight reaction that permits achieving high yields of BNNTs.

Figure 2:
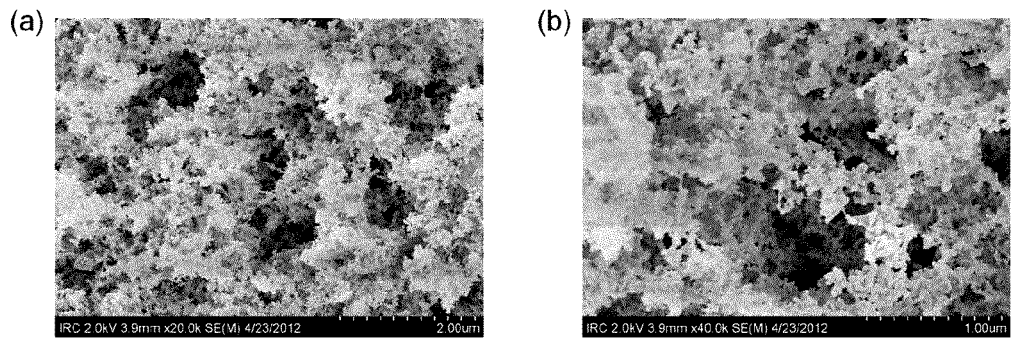
FIG. 2 depicts scanning electron microscope (SEM) images at different magnifications of a sample material produced without a source of hydrogen showing that a source of hydrogen is significant for the formation of BNNTs in the present invention.

Due to these differences, initial attempts to form BNNTs using the process conditions described in US 2009-0214799 did not produce BNNTs (FIG. 2). It is known in the art that similar induction plasma processes for CNTs can produce different materials (e.g. fullerenes, SWCNTs, and carbon blacks) depending on the operating conditions, even when the same feedstock is used. Given that the nucleation and growth mechanisms for BNNT production are very different than for CNT production, a new process for efficient BNNT production was invented herein.

Example 1a: h-BN Powder Using Argon-Nitrogen-Hydrogen Plasma at Pressure of 92 kPa (0.91 atm)

Pure hexagonal boron nitride (h-BN) powder (99.5%, avg. particle size 70 nm, MK-hBN-N70, M K Impex Corp.) was chosen as a feedstock. The as-received h-BN powder was sieved (300 μm) with a brush and baked at 100° C. overnight. No metallic catalyst was employed.

The reaction chamber included a graphite liner (80 mm id, 125 mm od and 1000 mm length, SIGRAFORM® HLM, SGL Carbon Group) surrounded by thermal insulating carbon felt, in order to extend the high temperature zone desirable for the growth of BNNTs.

Prior to feeding the feedstock, the temperature inside the induction plasma reactor was stabilized using argon-nitrogen-hydrogen plasma for an hour. In this preheating stage, the plasma operating conditions were: a ternary gas mixture of 90-slpm Ar, 3-slpm $H_2$ gas and 10-slpm $N_2$ in the sheath gas; 30-slpm of Ar in the central gas; 3-slpm of Ar in the carrier gas; 50 kW of plate power; and, 92 kPa (0.91 atm) of reactor pressure.

After the stabilization period, the plasma operating conditions were changed for BNNT synthesis as follows: a ternary gas mixture of 45-slpm Ar, 55-slpm $N_2$ gas and 20-slpm $H_2$ in the sheath gas; 30-slpm of Ar in the central gas; 3-slpm of Ar in the carrier gas; 50 kW of plate power; and, 92 kPa (0.91 atm) of reactor pressure.

Under these plasma operating conditions, the feedstock was continuously released from a powder feeder (KT20 twin-screw microfeeder, K-Tron, Inc.) with a feed rate of about 0.5 g/min and delivered to the injection probe located on the top of the torch using 3-slpm of Ar carrier gas.

After a 3-hour operation under these conditions, a total of 20.0 g of BNNT material was recovered. This represents a yield rate of about 6.7 grams per hour. The product comprised two different materials: a rubbery cloth-like material and an entangled fibril-like material. Due to light contamination by amorphous B by-product, the as-grown material was light-beige rather than snow-white.

Example 1b: h-BN Powder Using Argon-Nitrogen-Hydrogen Plasma at Pressure of 92 kPa (0.91 atm)

Another process was conducted following the same procedure as described in Example 1a except that the plasma operating conditions were changed. Thus, the ternary gas mixture in the sheath gas prior to feeding the feedstock used 110 slpm Ar instead of 90 slpm. Further, the ternary gas mixture in the sheath gas after the stabilization period was changed to use 25 slpm Ar instead of 45 slpm and 30 slpm $H_2$ instead of 20 slpm. This resulted in a recovery of 60.0 g of BNNT instead of only 20.0 g, which represents a yield rate of about 20.0 grams per hour instead of 6.7 grams per hour.

Example 2a: h-BN—Ni Mixture Using Argon-Nitrogen-Hydrogen Plasma at a Pressure of 92 kPa (0.91 atm)

Figure 3:
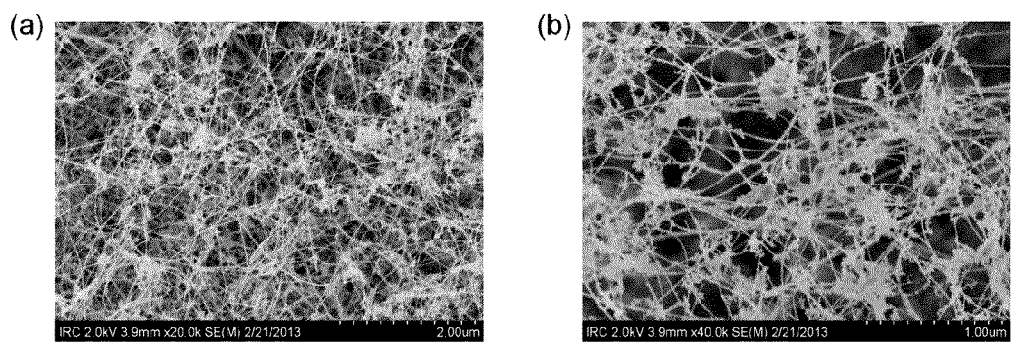
FIG. 3 depicts SEM images at different magnifications of a BNNT sample produced with a metal catalyst (Ni) showing that metal catalyst can be also used in the present invention for effective synthesis of BNNTs.

This test was specifically designed and performed to show that metal catalysts can be also used in the present induction thermal plasma process for an effective synthesis of BNNTs (FIG. 3). As a typical example, nickel (Ni, 99.5%, <1 μm particle size) was chosen as a metal catalyst.

A mixture of h-BN powder (99.5%, avg. particle size of 70 nm, MK-hBN-N70, M K Impex Corp.) and nickel was chosen as a feedstock. The as-received h-BN powder was well mixed with Ni using a rotary mixer at 60 rpm for 4 hours. Then the mixture was sieved (300 μm) with a brush and baked at 100° C. overnight. The final catalyst concentration of the mixture was 2.0 at. %.

The reaction chamber included a graphite liner (80 mm id, 125 mm od and 1000 mm length, SIGRAFORM® HLM, SGL Carbon Group) surrounded by thermal insulating carbon felt, in order to extend the high temperature zone desired for the growth of BNNTs.

Prior to feeding the feedstock, the temperature inside the reactor was stabilized using argon-nitrogen-hydrogen plasma for an hour. In this preheating stage, the plasma operating conditions were: a ternary gas mixture of 90-slpm Ar, 3-slpm $H_2$ gas and 10-slpm $N_2$ in the sheath gas; 30-slpm of Ar in the central gas; 3-slpm of Ar in the carrier gas; 50 kW of plate power; and, 92 kPa (0.91 atm) of reactor pressure.

After the stabilization period, the plasma operating conditions were changed for the BNNTs synthesis as follows: a ternary gas mixture of 45-slpm Ar, 55-slpm $N_2$ gas and 20-slpm $H_2$ in the sheath gas; 30-slpm of Ar in the central gas; 3-slpm of Ar in the carrier gas; 50 kW of plate power; and, 92 kPa (0.91 atm) of reactor pressure.

Under these plasma operating conditions, the feedstock was continuously released from a powder feeder (KT20 twin-screw microfeeder, K-Tron, Inc.) with a feed rate of about 0.5 g/min and delivered to the injection probe located on the top of the torch using 3-slpm of Ar carrier gas.

After a 3-hour operation under these conditions, a total of 20.0 g of BNNT material was recovered and the product comprises two different materials: a rubbery cloth-like material and an entangled fibril-like material. Due to light contamination by partially crystallized B by-product, the as-grown material was dark gray rather than snow-white.

Example 2b: h-BN—Ni Mixture Using Argon-Nitrogen-Hydrogen Plasma at a Pressure of 92 kPa (0.91 atm)

Another test was conducted following the same procedure as described in Example 2a except that the plasma operating conditions were changed. Thus, the ternary gas mixture in the sheath gas prior to feeding the feedstock used 110 slpm Ar instead of 90 slpm. Further, the ternary gas mixture in the sheath gas after the stabilization period was changed to use 25 slpm Ar instead of 45 slpm and 30 slpm $H_2$ instead of 20 slpm. This resulted in a recovery of 60.0 g of BNNT instead of only 20.0 g.

Example 3a: h-BN Powder Using Argon-Nitrogen-Ammonia Plasma at a Pressure of 66 kPa (0.65 atm)

This test was specifically designed and performed to show that any hydrogen-containing gases can be also used in the induction thermal plasma process for an effective synthesis of BNNTs. As a typical example, ammonia ($NH_3$, anhydrous, 99.99%) was chosen as a hydrogen-containing gas.

Pure h-BN powder (99.5%, avg. particle size 70 nm, MK-hBN-N70, M K Impex Corp.) was chosen as a feedstock. The as-received h-BN powder was sieved (300 μm) with a brush and baked at 100° C. overnight. No metallic catalyst was employed.

The reaction chamber included a graphite liner (80 mm id, 125 mm od and 1000 mm length, SIGRAFORM® HLM, SGL Carbon Group) surrounded by thermal insulating carbon felt, in order to extend the high temperature zone desired for the growth of BNNTs.

Prior to feeding the feedstock, the temperature inside reactor was stabilized using argon-nitrogen-hydrogen plasma for an hour. In this preheating stage, the plasma operating conditions were: a ternary gas mixture of 90-slpm Ar, 3-slpm $H_2$ gas and 10-slpm $N_2$ in the sheath gas; 30-slpm of Ar in the central gas; 3-slpm of Ar in the carrier gas; 50 kW of plate power; and, 66 kPa (0.65 atm) of reactor pressure.

After the stabilization period, the plasma operating conditions were changed for the BNNTs synthesis as follows: a ternary gas mixture of 55-slpm Ar, 55-slpm $N_2$ gas and 10-slpm $NH_3$ gas in the sheath gas; 30-slpm of Ar in the central gas; 3-slpm of Ar in the carrier gas; 50 kW of plate power; and, 66 kPa (0.65 atm) of reactor pressure.

Under these plasma operating conditions, the feedstock was continuously released from a powder feeder (KT20 twin-screw microfeeder, K-Tron, Inc.) with a feed rate of about 0.5 g/min and delivered to the injection probe located on the top of the torch using 3-slpm of Ar carrier gas.

After a 3-hour operation under these conditions, a total of 20.0 g of BNNT material was recovered and the product comprises two different materials: a rubbery cloth-like material and an entangled fibril-like material. Due to light contamination by amorphous B by-product, the as-grown material was light-beige rather than snow-white.

Example 3b: h-BN Powder Using Argon-Nitrogen-Ammonia Plasma at a Pressure of 66 kPa (0.65 atm)

Another test was conducted following the same procedure as described in Example 3a except that the plasma operating conditions were changed. Thus, the ternary gas mixture in the sheath gas prior to feeding the feedstock used 110 slpm Ar instead of 90 slpm. This resulted in a recovery of 60.0 g of BNNT instead of only 20.0 g.

Example 4: Characterization of Boron Nitride Nanotubes

Figure 4:
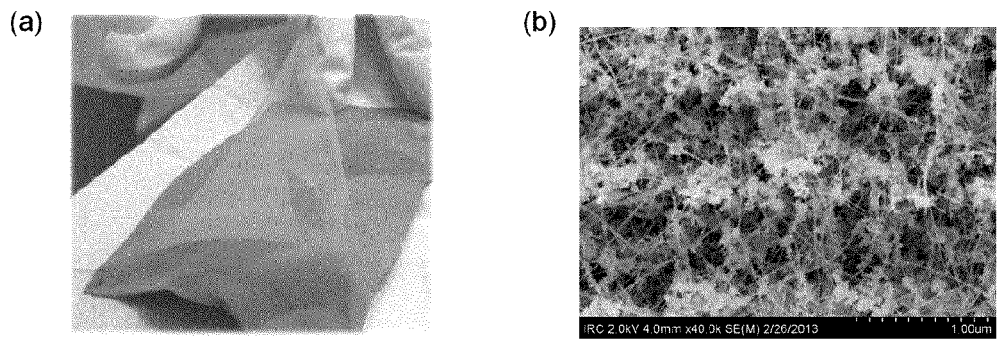
FIG. 4 depicts cloth-like BNNT materials produced in the present invention without metal catalyst where (a) is a macroscopic photo, and (b) is a SEM image showing BNNTs in the cloth-like material.
Figure 5:
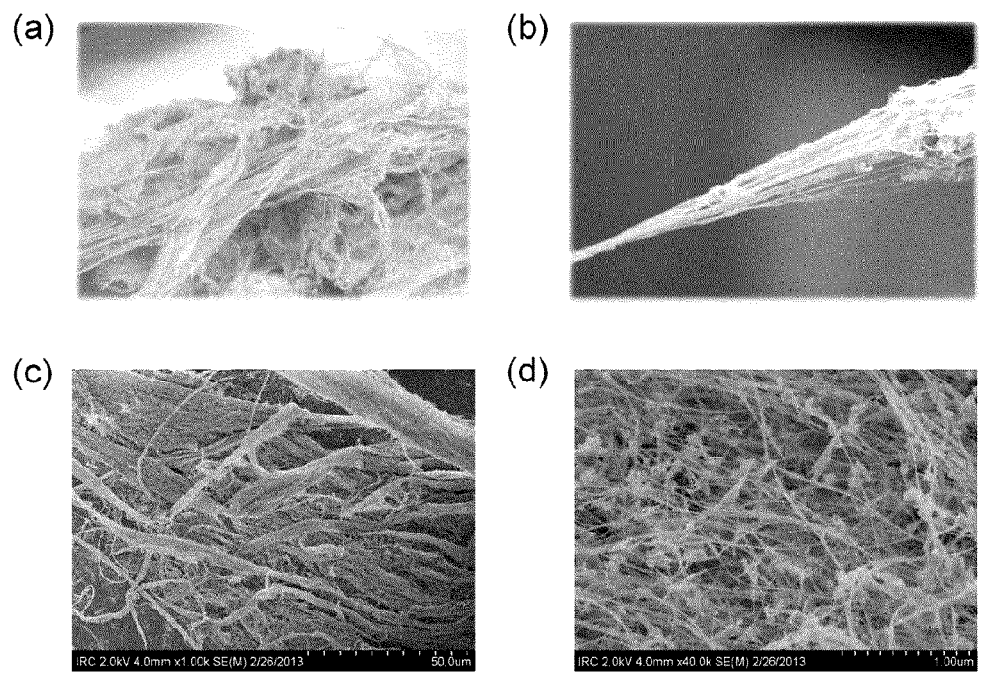
FIG. 5 depicts fibril-like BNNT materials produced in the present invention without metal catalyst where (a) and (b) are macroscopic photos, (c) is a low magnification SEM image showing the fibril-like structure, and (d) is a high-magnification SEM image showing dense BNNTs and its high purity.
Figure 6:
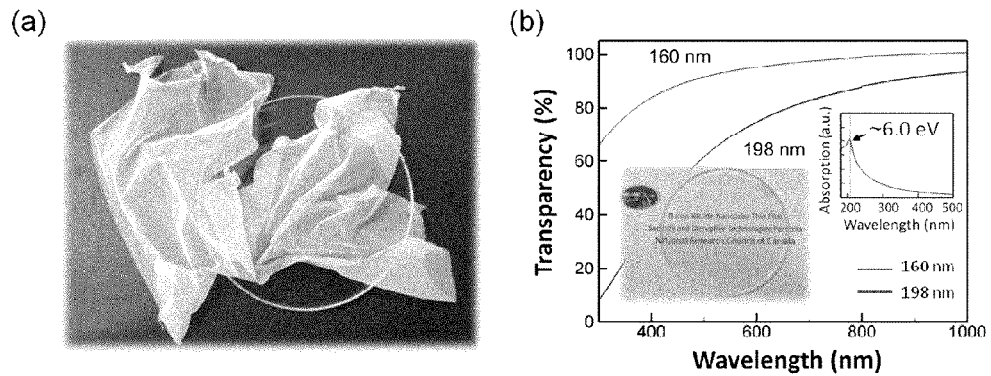
FIG. 6 depicts (a) a macroscopic photograph of a thin transparent BNNT film produced in the present invention without metal catalyst, and (b) results of ultraviolet-visible (UV-Vis) transmission and absorption measurements performed on the thin transparent BNNT film (thickness: 160 nm and 198 nm) transferred onto quartz disks, where the absorption around 200 nm (inset) indicates the existence of h-BN materials in the sample.

Most BNNT materials produced with prior art processes are limited to deposits scraped from the reactor walls or cotton-like fibrils. However, real applications or scientific investigation of as-produced materials may require materials in various forms. In contrast, BNNT materials formed in the processes described above show a great diversity in morphology. The present process can produce BNNT materials with several different morphologies in the same run, including i) laminated flexible cloth-like materials on the surfaces of filters (FIG. 4), ii) fibril-like materials on the top of filters (FIG. 5), and iii) thin transparent films on the walls of the pipe between the reactor and the filtration chamber (FIG. 6).

The cloth-like material (20 cm×50 cm) is flexible and mechanically strong which would be ideal for direct uses in manufacturing macroscopic-scale smart materials for civil or mechanical applications. This material is composed of multiple layers where thin membranes can be easily peeled off as shown in FIG. 4(a). FIG. 4(b) presents a scanning electron microscope (SEM) image of this material. The purity seems to be reasonably high (over 50%), even though non-tubular impurities are present in the samples. The length of BNNTs is estimated few μm.

Fiber or yarn is one of the attractive forms of functional nano-materials. In contrast to the CNT case, macroscopic BNNT yarns have never been tested for their mechanical properties due to the absence of reliable fabrication methods. In the present invention, macroscopic-long fibers can be directly drawn from the fibril-like material simply by pulling them out as shown in FIG. 5(b). The purity of the fibril-like material seems be much higher than that of the cloth-like material. A large quantity of fibrous material is observed in the SEM image of this material with less non-tubular impurities (FIG. 5(d)). The purity of the as-produced material is high enough so that spinning fiber directly from the reactor is possible.

In the present invention, thin transparent BNNT films can be synthesized in-situ without any substrates in the pipe located between the reactor and the filtration chamber. This as-grown BNNT film which is stretchable, sticky and highly electrostatic uniformly covers the entire surface of the pipe and seems to be formed by diffusion of BNNTs towards the cold wall by electrostatic or thermophoretic forces. This thin film peels off readily from the surfaces and is mechanically strong enough to free-stand without polymer supports as shown in FIG. 6(a). For specific applications, this thin film may be easily transferable to arbitrary surfaces. It is demonstrated that this thin film can be directly transferable to a quartz disk via one single step of spraying methanol on it. In order to investigate its transmission and absorption characteristics in the UV-Vis range, two thin transparent BNNT films (thickness: 160 nm and 198 nm) were transferred on quartz disks and tested. As shown in FIG. 6(b), a good transmittance is obtained with a 160 nm-thick film over a wide range of wavelengths, which is very promising for transparent armor applications. The absorption observed around 200 nm (inset of FIG. 6(b)) indicates the existence of h-BN materials in the film with a band gap of about 6.0 eV.

This diversity in the morphology of the product will push the boundaries in the direct uses of as-produced BNNT materials.

Figure 7:
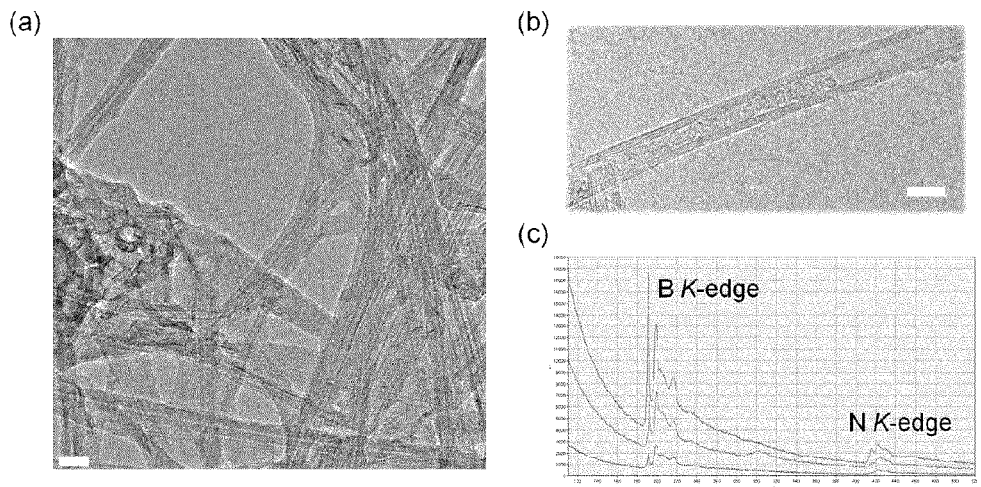
FIG. 7 depicts (a) a high resolution transmission electron microscope (HRTEM) image of the BNNT material produced in the present invention without metal catalyst (the scale bar is 20 nm); (b) a high magnification HRTEM image of a few-walled BNNT having a diameter of 5 nm (the scale bar is 5 nm); (c) electron energy loss spectra of the BNNTs produced in the present invention showing that the tubes comprise both boron and nitrogen.

Transmission electron microscope (TEM) images in FIG. 7 confirm that the fibrous materials seen in the SEM images have a tubular structure. The majority of the BNNTs are few walled, their diameters being less than 10 nm. Large diameter tubes over 20 nm are not observed throughout the samples. The TEM images of tubes also reveal that their structural quality is high without any noticeable defects on the surface of the tube. The structural quality the BNNTs seems to be improved by the high temperature environment of the process. For the chemical composition analysis, electron energy loss spectroscopy (EELS) measurements have been conducted. FIG. 7(c) shows EELS spectra of the BNNTs produced in the present invention. The K-shell ionization edges of B and N can be seen in the spectra which confirm that the tubes are composed of both B and N. The carbon peak between the two peaks is also observable due to sample contamination, probably from carbon grid.

Figure 8:
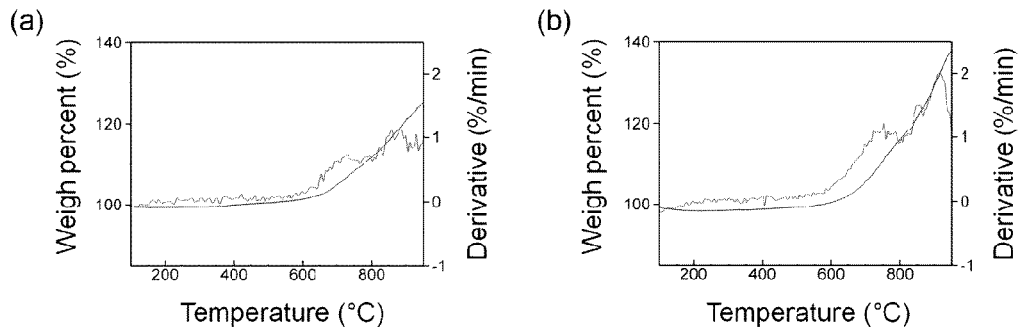
FIG. 8 depicts thermogravimetry (TG) and derivative thermogravimetry (DTG) plots of (a) fibril-like and (b) cloth-like BNNT materials produced in the present invention without metal catalyst, where weight gains observed after 600° C. are mainly due to oxidation of amorphous B in the samples.

The thermal stability of the BNNT materials produced is investigated by the thermogravimetry analysis (TGA). The thermal oxidation temperatures of h-BN materials are known to be higher than 1000° C. FIG. 8 shows the thermogravimetry (TG) and derivative thermogravimetry (DTG) plots of the fibril-like and cloth-like BNNT materials produced in the present invention. Both materials are stable up to 600° C. under air oxidation; however they started to gain weight at 600° C. primarily due to the oxidation of amorphous B impurity present in the samples. Since the cloth-like material gained more weight compared to the fibril-like BNNT material, it can be concluded that the cloth-like material contains more amorphous B impurity.

Example 5a: Purification of Boron Nitride Nanotubes by Solution Processing

Figure 9:
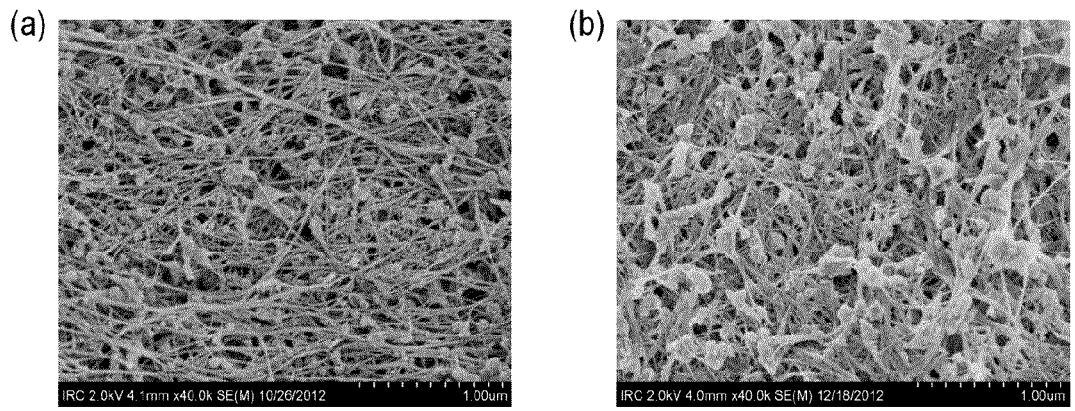
FIG. 9 depicts SEM images of BNNTs produced in the present invention without metal catalyst and purified by (a) washing with $NH_4OH$ and (b) washing with water and then treating with hot $H_2O_2$; and, FIG. 10 depicts SEM images of BNNTs produced in the present invention without metal catalyst and purified by thermal oxidation in air.

The use of pure h-BN powder as feedstock in this invention allows for a simple and scalable purification process. Various material characterizations have identified three major impurities found in the as-produced BNNT materials: i) unreacted h-BN powder; ii) B-containing polymers; and, iii) elemental B. Nano-sized h-BN powder and some of the B-containing polymers are readily dispersed in water due to the solvent polarity effect. When the cloth-like material is washed with $NH_4OH$ or water, the material retains its cloth-like structure as a result of BNNTs inherent strength, promoting the physical separation of h-BN and some of the B-containing polymers into solution (FIG. 9(a)).

The remaining beige material (amorphous B) contains elemental B and left-over B-containing polymers that can be easily oxidized to boron oxide, which is water soluble. The amorphous B was easily oxidized using hot ~30% $H_2O_2$ (FIG. 9(b)). The oxidation reaction clearly transformed the material from beige to off-white. After several washings with water, the material appears very white in suspension.

As a result of chemical characteristics of the as-produced material, the purification process only needs water as the sole solvent and hydrogen peroxide as the sole oxidizer providing a green and accessible purifying method.

Example 5b: Purification of Boron Nitride Nanotubes by Air Oxidation

Figure 10:
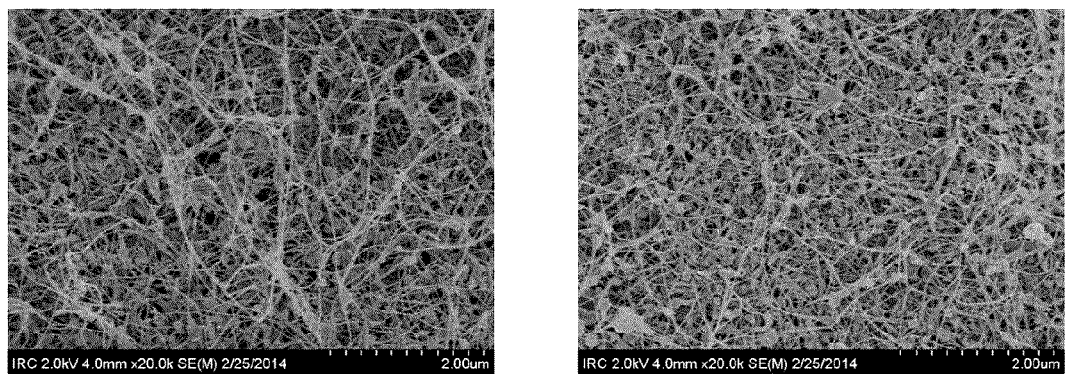

The use of pure h-BN powder as feedstock in this invention allows for a simple and scalable purification process. Various material characterizations have identified three major impurities found in the as-produced BNNT materials: i) unreacted h-BN powder; ii) B-containing polymers and, iii) elemental B. These impurities can be easily removed by a simple three steps process comprising: 1) mulching or fluffing the raw materials using a mulcher; 2) air oxidation at a temperature in a range of 650° C. to 850° C.; and, 3) removal of boron oxides, unreacted h-BN and derivatives thereof using water or methanol as solvents and filtration. As shown in FIG. 10 the collected solid material is highly pure BNNT material.

REFERENCES

The contents of the entirety of each of which are incorporated by this reference.

Arenal D, et al. (2007) Root-growth mechanism for single-walled boron nitride nanotubes in laser vaporization technique. *J. Am. Chem. Soc.* 129, 16183.

Chen H, et al. (2008) Over 1.0 mm-long boron nitride nanotubes. *Chem. Phys. Lett.* 463, 130.

Chopra N G, et al. (1995) Boron nitride nanotubes. *Science.* 269, 966.

Cummings J, et al. (2000) Mass-production of boron nitride double-wall nanotubes and nanococoons. *Chem. Phys. Lett.* 316, 211.

Golberg D, et al. (1996) Nanotubes in boron nitride laser heated at high pressure. *App. Phys. Lett.* 69, 2045.

Golberg D, et al. (2007) Boron nitride nanotubes. *Adv. Mater.* 19, 2413.

Golberg D, et al. (2010) Boron nitride nanotubes and nanosheets. *ACS Nano.* 4, 2979.

Huang Y, et al. (2011) Bulk synthesis, growth mechanism and properties of highly pure ultrafine boron nitride nanotubes with diameters of sub-10 nm. *Nanotech.* 22, 145602.

Kim M J, et al. (2008) Double-walled boron nitride nanotubes grown by floating catalyst chemical vapor deposition. *Nano Lett.* 8, 3298.

Laude T, et al. (2000) Long ropes of boron nitride nanotubes grown by a continuous laser heating. *App. Phys. Lett.* 76, 3239.

Lee C H, et al. (2008) Effective growth of boron nitride nanotubes by thermal chemical vapor deposition. *Nanotech.* 19, 455605.

Lee C H. (2010) Patterned growth of boron nitride nanotubes by catalytic chemical vapor deposition. *Chem. Mater.* 22, 1782.

Lee C M, et al. (2006) Synthesis of boron nitride nanotubes by arc-jet plasma. *Curr. Appl. Phys.* 6, 166.

Li L, et al. (2008) Synthesis of boron nitride nanotubes, bamboos and nanowires. *Physica E.* 40, 2513.

Loiseau A, et al. (1996) Boron nitride nanotubes with reduced number of layers synthesized by arc discharge. *Phys. Rev. Lett.* 76, 4737.

Lourie O R, et al. (2000) CVD growth of boron nitride nanotubes. *Chem. Mater.* 12, 1808.

Ma R, et al. (2001) CVD synthesis of boron nitride nanotubes without metal catalysts. *Chem. Phys. Lett.* 33, 61.

Shimizu Y, et al. (1999) Boron nitride nanotubes, webs, and coexisting amorphous phase formed by the plasma jet method. *Appl. Phys. Lett.* 75, 929.

Simard B, et al. (2009) Method and apparatus for the continuous production and functionalization of single-walled carbon nanotubes using a high frequency plasma torch. United States Patent Publication US 2009/0214799 published Aug. 27, 2009.

Smith M W, et al. (2009) Very long single- and few-walled boron nitride nanotubes via the pressurized vapor/condenser method. *Nanotech.* 20, 505604.

Smith M W, Jordan K, Park C. (2012) Boron nitride nanotubes. U.S. Pat. No. 8,206,674 issued Jun. 26, 2012.

Su D-Y, et al. (2009) Selective growth of boron nitride nanotubes by the plasma-assisted and iron-catalytic CVD methods. *J. Phys. Chem. C.* 113, 14681.

Tang C, et al. (2002) A novel precursor for synthesis of pure boron nitride nanotubes. *Chem. Comm.* 1290.

Treichel H, et al. (1997) Method for manufacturing microcrystalline cubic boron-nitride-layers. U.S. Pat. No. 5,629,053 issued May 13, 1997.

Zettl A K. (2013) Method and Device to Synthesize boron Nitride Nanotubes and Derived Nanoparticles. US Patent Publication 2013/0064750 published Mar. 14, 2103.

Zhi C, et al. (2005) Effective precursor for high yield synthesis of pure BN nanotubes. *Solid Stat. Comm.* 135, 67.

The novel features of the present invention will become apparent to those of skill in the art upon examination of the detailed description of the invention. It should be understood, however, that the scope of the claims should not be limited by the preferred embodiments set forth in the examples, but should be given the broadest interpretation consistent with the specification as a whole.

What is claimed is:

1. A process for producing boron nitride nanotubes (BNNTs) comprising providing one or more sources of boron, nitrogen and hydrogen to a stable induction plasma at a plasma temperature in a range of 1000-10,000 K to form a reaction mixture of boron, nitrogen and hydrogen in the plasma under a pressure of greater than 0.6 atm and less than 2 atm, and cooling the reaction mixture to form BNNTs, the one or more sources of boron comprising elemental boron, boron nitride, borane, ammonia borane, borazine, or any mixture thereof.

2. The process according to claim 1, wherein the one or more sources of nitrogen comprises boron nitride, $N_2$, $NH_3$, $NH_4OH$, borazine or any mixture thereof, and wherein the one or more sources of hydrogen comprises $H_2$, $NH_3$, $NH_4OH$, a borane or any mixture thereof.

3. The process according to claim 1, wherein the one or more sources of boron comprises hexagonal boron nitride, the one or more sources of nitrogen comprises a mixture of hexagonal boron nitride and $N_2$ and the one or more sources of hydrogen comprises $H_2$.

4. The process according to claim 1, wherein the one or more sources of boron is free of metal.

5. The process according to claim 1, wherein at least one of the sources of nitrogen is a gas and at least one of the sources of hydrogen is a gas and the gases are provided to the stable induction plasma in a sheath gas.

6. The process according to claim 5, wherein the sheath gas further comprises an inert gas.

7. The process according claim 5, wherein the at least one source of hydrogen is present in the sheath gas in an amount of 5-20%.

8. The process according to claim 5, wherein the at least one source of nitrogen is present in the sheath gas in an amount of 35-65%.

9. The process according to claim 1, wherein the pressure is greater than 0.95 atm.

10. The process according to claim 1, wherein the pressure is in a range of 0.9 atm to 1.9 atm.

11. The process according to claim 1, wherein the pressure is in a range of 0.95 atm to 1.9 atm.

12. The process according to claim 1, wherein the pressure is in a range of 0.9 atm to 1 atm.

13. The process according to claim 1, wherein the reaction mixture is further provided with a metal catalyst.

14. The process according to claim 1, wherein the reaction mixture further comprises a source of carbon and the BNNTs produced are doped with carbon.

15. The process according to claim 1, wherein the stable induction plasma has a temperature in a range of 7,000-9,000K at a core of the plasma.

16. The process according to claim 1, further comprising collecting the BNNTs by filtration in a filtration zone downstream of the reaction zone.

* * * * *